United States Patent
Cox et al.

(10) Patent No.: US 12,031,469 B2
(45) Date of Patent: Jul. 9, 2024

(54) SYSTEMS AND METHODS FOR CONTROLLING AN AFTER-TREATMENT SYSTEM COMPRISING AN ELECTRONIC CATALYST

(71) Applicant: Ford Global Technologies, LLC, Dearborn, MI (US)

(72) Inventors: David Cox, London (GB); David Hesketh, Ingatestone (GB); Themi Petridis, Bishop's Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/210,474

(22) Filed: Jun. 15, 2023

(65) Prior Publication Data
US 2023/0399968 A1    Dec. 14, 2023

Related U.S. Application Data

(63) Continuation of application No. 17/521,224, filed on Nov. 8, 2021, now Pat. No. 11,713,702.

(51) Int. Cl.
*F01N 3/20*        (2006.01)

(52) U.S. Cl.
CPC ........ *F01N 3/2013* (2013.01); *F01N 2240/16* (2013.01); *F01N 2590/11* (2013.01); *F01N 2900/0601* (2013.01); *F01N 2900/08* (2013.01); *F01N 2900/104* (2013.01); *F01N 2900/1602* (2013.01); *F02D 2200/701* (2013.01)

(58) Field of Classification Search
CPC .............. F01N 3/2013; F01N 2240/16; F01N 2590/11; F01N 2900/0601; F01N 2900/08; F01N 2900/104; F01N 2900/1602; F02D 2200/701
See application file for complete search history.

(56) References Cited

U.S. PATENT DOCUMENTS

| | | | |
|---|---|---|---|
| 7,983,812 B2 * | 7/2011 | Potter | F02N 11/0803 455/343.5 |
| 9,074,509 B2 | 7/2015 | Takara | |
| 9,410,458 B2 | 8/2016 | Gonze et al. | |
| 10,934,920 B2 | 3/2021 | Hirooka | |
| 2009/0038295 A1 | 2/2009 | Gonze et al. | |
| 2011/0305601 A1 | 12/2011 | Kawase et al. | |
| 2012/0000182 A1 * | 1/2012 | Gonze | F01N 3/0878 60/287 |

(Continued)

FOREIGN PATENT DOCUMENTS

| | | |
|---|---|---|
| CN | 112523844 A | 3/2021 |
| DE | 102018213599 A1 | 2/2020 |

*Primary Examiner* — Brandon D Lee
(74) *Attorney, Agent, or Firm* — Haley Guiliano LLP

(57) ABSTRACT

Methods and systems are provided to heat a catalyst of an after-treatment system for a vehicle. The after-treatment system is powered by a battery. An operational parameter of the battery and the driving mode of the vehicle is determined. After receiving an indication that a first operational parameter threshold has been surpassed and a torque demand of the vehicle has been predicted, heat is provided to the catalyst of the after-treatment system based on the predicted torque demand of the vehicle surpassing a second operational parameter threshold.

18 Claims, 11 Drawing Sheets

(56) References Cited

U.S. PATENT DOCUMENTS

2013/0035845 A1* 2/2013 Takara .................. F01N 13/009
                                                            701/113
2018/0162397 A1   6/2018 Eo et al.
2020/0232370 A1   7/2020 Hirooka et al.
2021/0222638 A1*  7/2021 Hirooka ................ F01N 3/2026

* cited by examiner

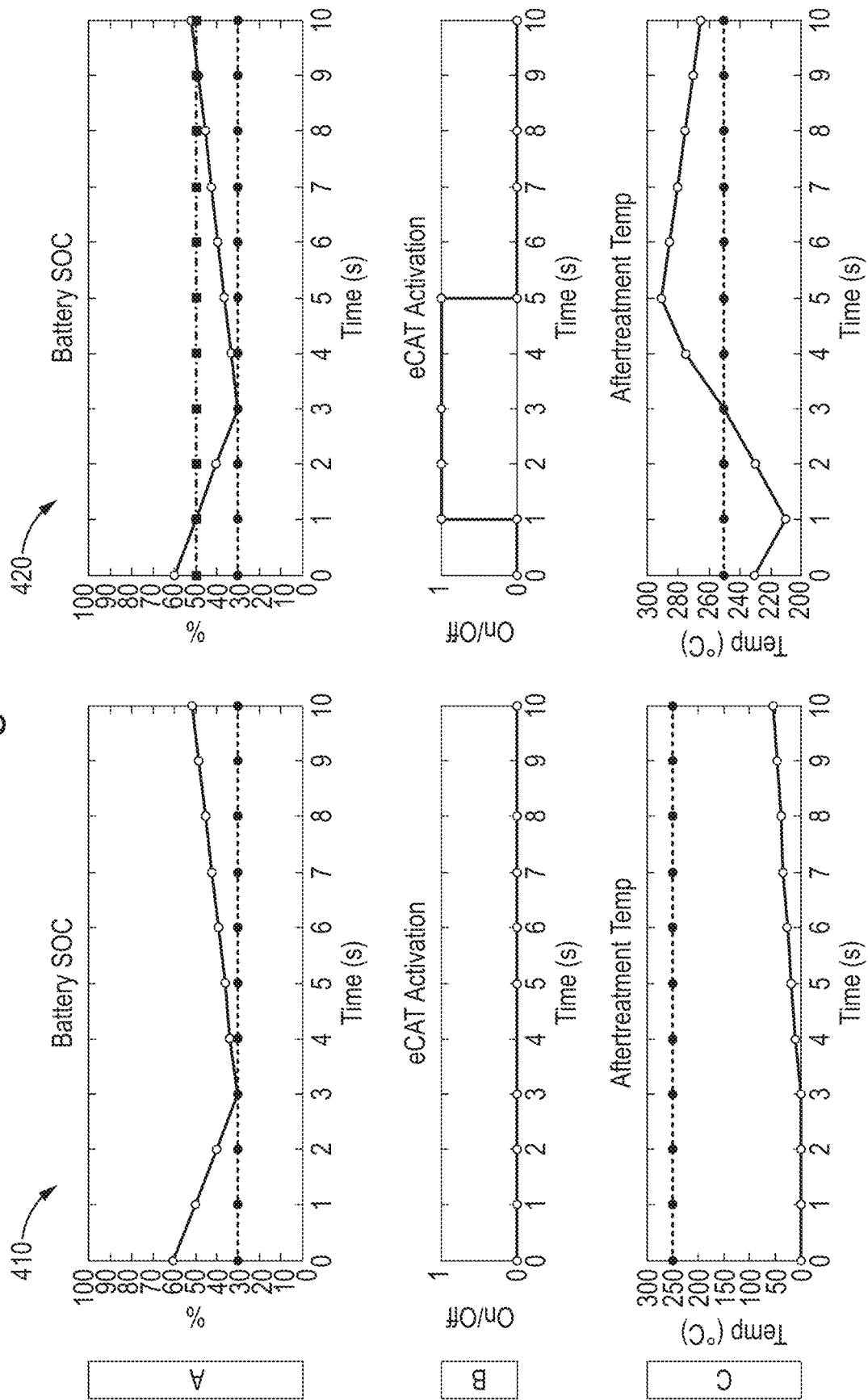

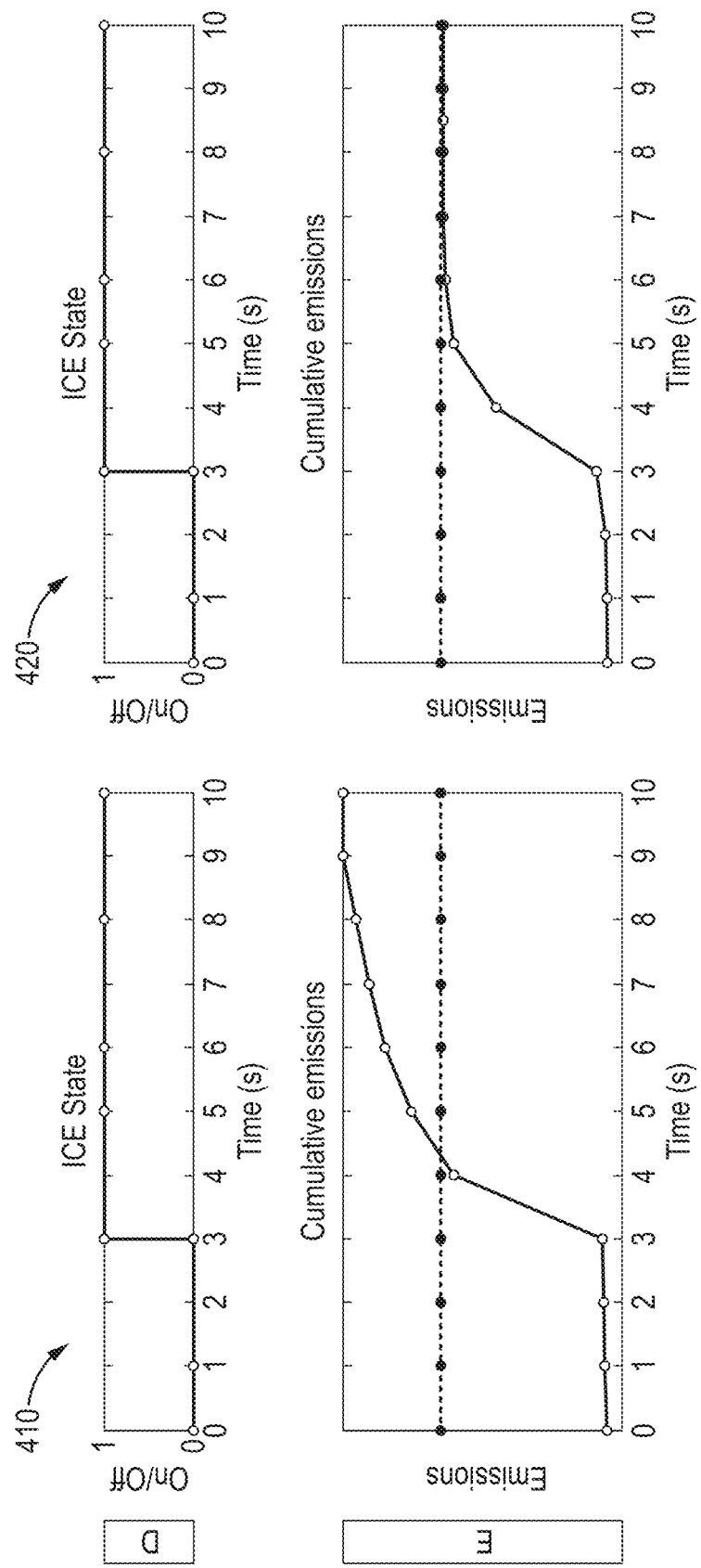

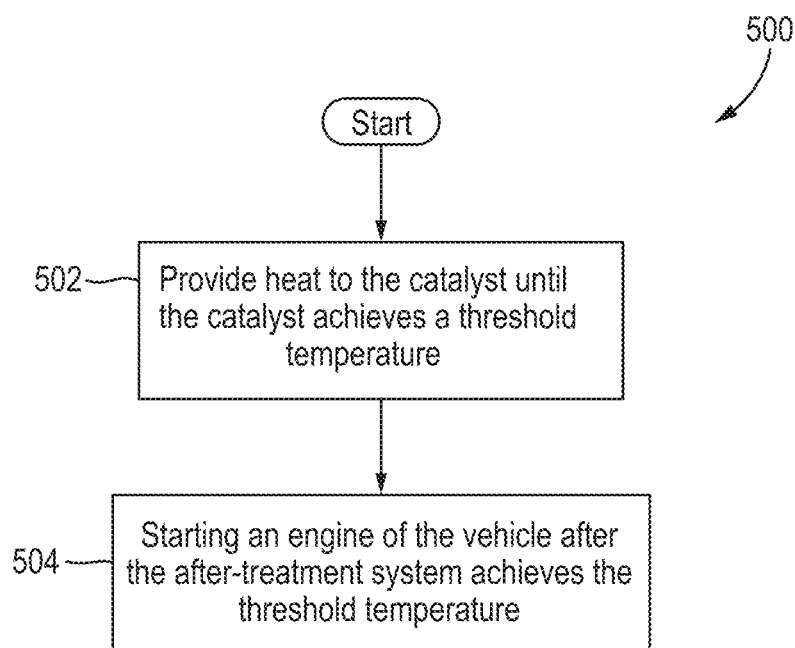

SYSTEMS AND METHODS FOR CONTROLLING AN AFTER-TREATMENT SYSTEM COMPRISING AN ELECTRONIC CATALYST

CROSS REFERENCE TO RELATED APPLICATIONS

This application is a continuation of U.S. patent application Ser. No. 17/521,224, filed Nov. 8, 2021, the disclosure of which is hereby incorporated by reference herein in its entirety.

BACKGROUND

The present disclosure relates to systems and methods for controlling a heating element for providing heat to a catalyst of an after-treatment system, more particularly, but not exclusively, to systems and methods for selectively operating a heating module of an after-treatment system of a hybrid vehicle to maintain emissions, performance, and improve hybrid battery durability and life.

SUMMARY

Through consumer demand and local regulation, the need for reduced engine emissions has led to engine exhaust systems that comprise catalytic converters. Catalytic converters are a specific type of engine after-treatment system that reduces pollutants in exhaust gases by catalyzing a redox reaction. Catalytic converters are located downstream of the engine within a structure/housing in the exhaust system, that is designed to contain and direct exhaust gases over and/or through the catalytic converter. Like many after-treatment systems, catalytic converters require heating up to be most effective. As the demand for cleaner emissions increases and legislation requires a reduction in the pollutants produced by internal combustion engines, solutions involving exhaust after-treatment systems are increasingly desired.

Full Hybrid Electric Vehicles (FHEV) and Plug-In Hybrid Electric Vehicles (PHEV) can operate in electric only driving mode, without the internal combustion engine running, using the high voltage system to propel the vehicle. However, in some use cases, the engine will need to start due to the limitations of the high voltage traction battery. For example, the engine may need to start during electric only driving to charge the battery or to support the torque demand by the driver. In transient maneuvers, such as during an overtaking scenario, the engine may need to start so that the demanded torque can be satisfied.

However, during electric only driving, without thermal energy from the engine, the after-treatment temperature decreases and an optimal operating temperature is not maintained for all use cases. Therefore, if the engine is started, emissions requirements may be exceeded. In other cases, significant user dissatisfaction will arise when torque requested by the user is delayed while waiting for preheating of the after-treatment to occur.

According to examples in accordance with an aspect of the disclosure, there is provided with a method of providing heat to a catalyst of an after-treatment system, e.g., of a vehicle. The after-treatment system is powered by a battery. For example, the after-treatment system may comprise one or more electrical components configured to receive power from a battery, e.g., a battery of the vehicle. The method comprises determining an operational parameter of the battery, receiving an indication that a first operational parameter threshold has been surpassed, and predicting a torque demand of the vehicle. Heat is provided to the catalyst of the after-treatment system based on the predicted torque demand causing a second operational parameter threshold of the vehicle to be surpassed.

In some examples, the operational parameter is at least one of a temperature of the battery and its components; a state of charge of the battery; a power demand from, for example, a hybrid power unit and/or a vehicle component, which may further include a power input or power output; current demand from, for example, a hybrid power unit and/or a vehicle component, which may further include a current input or current output; a voltage, for example, a potential difference across a hybrid power unit and/or a vehicle component; or a contactor or relay state. In some examples, there is a first operational parameter threshold associated with each operational parameter. Each first operational parameter threshold may be a predetermined value associated with a respective operational parameter. Each first operational parameter threshold may be a configurable value associated with a respective operational parameter, e.g., a dynamically configurable value dependent on one or more operational conditions of a vehicle. Each first operational parameter threshold may be considered as a "soft" threshold, e.g., meaning that passing the first operational parameter threshold does not cause damage, or would be unlikely to cause damage, to the system or components (e.g., the battery or the after-treatment system). In some examples, exceeding the first operational parameter threshold without remedy, e.g., exceeding a battery state of charge threshold without recharging the battery, may mean that is not possible to meet a future driver demand, such as a torque demand.

In some examples, there is a second operational parameter threshold associated with each operational parameter. Each second operational parameter threshold may be a predetermined value associated with a respective operational parameter that is greater than the first operational parameter threshold. Each second operational parameter threshold may be considered as a "hard" threshold, e.g., meaning that the second operational parameter threshold that cannot be surpassed without affecting the drivability of the vehicle (e.g., being unable to provide a torque demand, or putting the vehicle into limp mode). In some examples, the power output may be measured as energy output, i.e., the total amount of energy a battery can be expected to store and discharge at any given moment or over time.

In some examples, the driving mode is one of electric propulsion; combustion engine propulsion; or a combination thereof, e.g., a hybrid power unit. In some examples, the method further comprises starting the engine based on one or more contextual factors. In some examples, the method further comprises starting the engine based on one or more operational parameters. For example, the engine start-up procedure may be altered based on one or more contextual factors and/or one or more operational parameters. In some examples, predicting a torque demand of the vehicle comprises determining a driving mode of the vehicle.

In some examples, the prediction of the torque demand is based on at least one of GPS, ADAS, traffic sign recognition, cruise control, driver input, navigation route, ambient temperature, or historic route information.

In some examples, the first operational parameter threshold is configurable based on the driving mode of the vehicle.

In some examples, the method further comprises providing heat to the catalyst until the catalyst achieves a threshold temperature; and starting an engine of the vehicle after the after-treatment system achieves the threshold temperature.

In some examples, the method further comprises determining a minimum amount of energy required to meet an optimal temperature for catalyst light off. For example, it may be determined that 60,000 J of energy is requested to bring the after-treatment system up to optimal temperature for the catalyst to work at peak efficiency and ensure that the local regulation emissions are met. In this way, it can be determined that, for an exemplary 2 kW heating element in the after-treatment system, 30 seconds of activation would be needed. This, in turn, informs the system of the window for predicting the torque demand of the vehicle.

In some examples, predicting a torque demand of the vehicle the method further comprises receiving vehicle data and determining from the vehicle data that the torque of the vehicle will remain constant. For example, it may be determined that torque demand will remain constant because the user is on a motorway at cruising speed with no traffic.

According to a second example in accordance with an aspect of the disclosure, there is provided with an after-treatment system of a vehicle comprising a battery, a heating module, electrically coupled to the battery, and a control module, communicatively coupled to the heating module and the battery. In some examples, the heating module further comprises a plurality of heating elements. The control module is configured to: determine an operational parameter of the battery, receive an indication that a first operational parameter threshold has been surpassed, predict a torque demand of the vehicle; and provide heat, with the heating module, to the after-treatment system based on the predicted torque demand causing a second operational parameter threshold to be surpassed.

In some examples, at least one of the plurality of heating elements of the heating module is selectively operated to provide heat to the catalyst based on one or more of the contextual factors.

According to a third example in accordance with an aspect of the disclosure, there is provided with a vehicle. The vehicle comprises an after-treatment system. The after-treatment system has a battery, a heating module, electrically coupled to the battery, and a control module, communicatively coupled to the heating module and the battery, to provide heat to a catalyst of the after-treatment system. In some examples, the vehicle also comprises an engine, such as an internal combustion engine (ICE).

According to a fourth example in accordance with an aspect of the disclosure, there is provided with a non-transitory computer-readable medium having instructions encoded thereon for carrying out the method of providing heat to a catalyst of an after-treatment system for a vehicle, the after-treatment system powered by a battery, the method comprising: determining an operational parameter of the battery; determining a driving mode of the vehicle; receiving an indication that a first operational parameter threshold has been surpassed; predicting a torque demand of the vehicle; and providing heat to the catalyst of the after-treatment system based on the predicted torque demand of the vehicle surpassing a second operational parameter threshold.

For the avoidance of doubt, the system and methods for providing heat to a catalyst of an after-treatment system for a vehicle, according to any of the examples described herein, may be used to improve the life of a battery powering the after-treatment system. Whilst the benefits of the systems and method may be described by reference to hybrid vehicles, it is understood that the benefits of the present disclosure are not limited to such types of vehicle, and may also apply to other types of vehicles, such as forklifts, trucks, buses, locomotives, motorcycles, aircraft and watercraft, and/or non-vehicle based systems that utilize a catalytic converter, such as electrical generators, mining equipment, stoves, and gas heaters.

These examples and other aspects of the disclosure will be apparent and elucidated with reference to the example(s) described hereinafter. It should also be appreciated that particular combinations of the various examples and features described above and below are often illustrative and any other possible combination of such examples and features are also intended, notwithstanding those combinations that are intended as mutually exclusive.

BRIEF DESCRIPTION OF THE DRAWINGS

The above and other objects and advantages of the disclosures herein will be apparent upon consideration of the following detailed description, taken in conjunction with the accompanying drawings, in which:

FIGS. 4A and 4B illustrate Battery state of charge (SOC), eCAT activation, Aftertreatment temperature, ICE state, cumulative emissions, in accordance with at least one of the examples described herein.

FIG. 5 illustrates an example flow chart of a method of providing heat to a catalyst of an after-treatment system and starting an engine of the vehicle, in accordance with at least one of the examples described herein.

DETAILED DESCRIPTION

Figure 1:
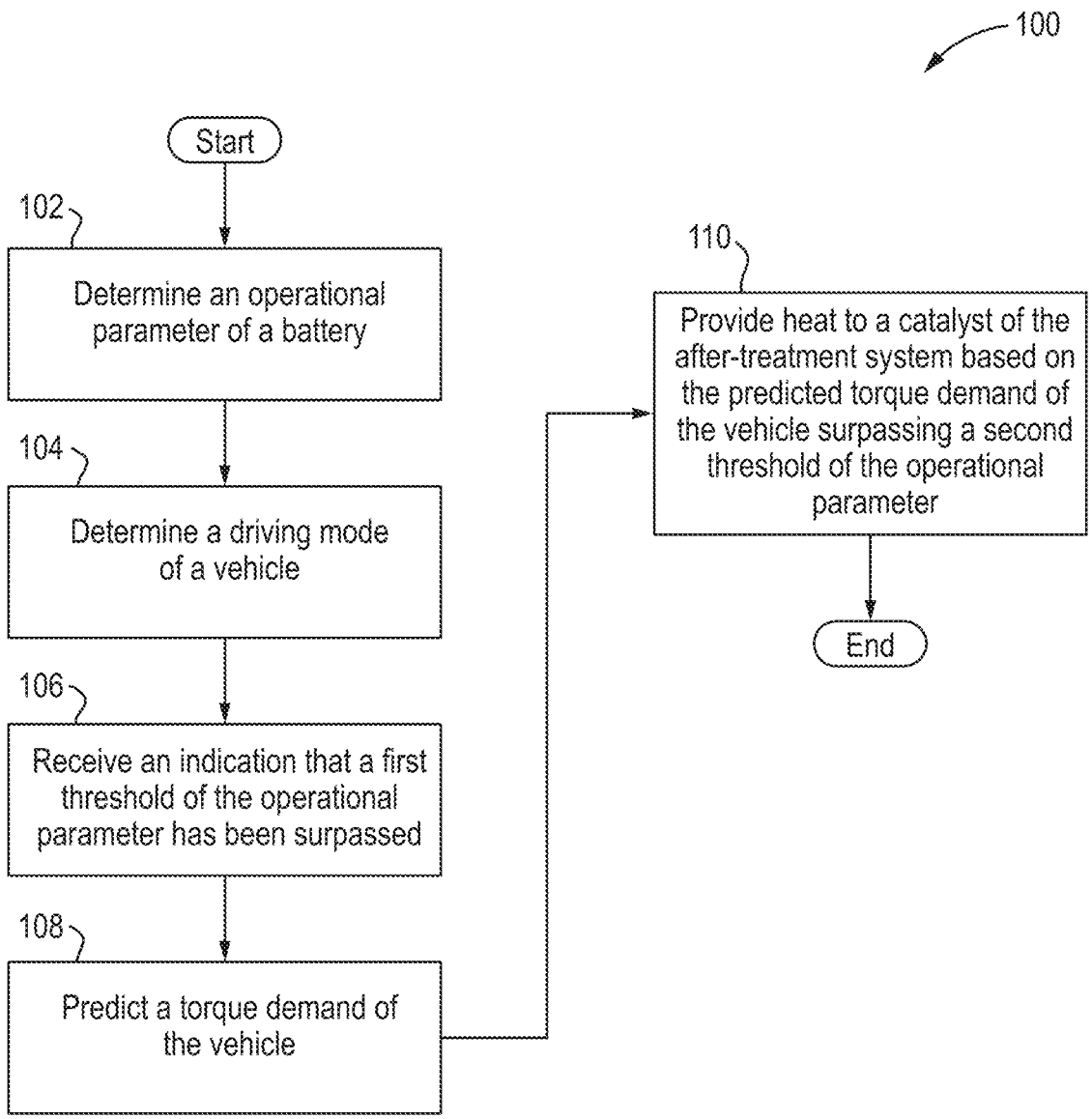
FIG. 1 illustrates an example flow chart of a method of providing heat to a catalyst of an after-treatment system, in accordance with at least one of the examples described herein.

It should be understood that the detailed description and specific examples herein while indicating exemplary embodiments, are intended for purposes of illustration only and are not intended to limit the scope of the disclosure. These and other features, aspects, and advantages of the present disclosure will become better understood from the following description, appended claims, and accompanying drawings. It should be understood that the Figures are merely schematic and are not drawn to scale. It should also be understood that the same or similar reference numerals are used throughout the Figures to indicate the same or similar parts.

As discussed briefly above, current regulations on emissions standards are requiring manufacturers of internal combustion engines to reduce the operating emissions from the engines they manufacture. These engines are used in any appropriate type of vehicle, such as an automobile, a motorbike, a marine vessel, or an aircraft. In particular, the vehicle may be any appropriate type of hybrid vehicle, such as a Hybrid Electric Vehicle (HEV), a Plug-in Hybrid Electric Vehicle (PHEV), a Mild Hybrid Electric Vehicle (mHEV), or any other vehicle having an engine and an electrified powertrain. Typically, hybrid vehicles use two or more distinct types of means to store energy, such as batteries to store electrical energy and gasoline/diesel to store chemical energy. The basic principle of hybrid vehicles is that the different types of motors have diverse efficiencies under different conditions, such as top speed, torque, or acceleration and therefore switching from one type of motor to another yields greater efficiencies than either one could have their own. However, under the proposed new emissions standards in markets such as, for example, the European Union (EU), North America, China, and the United Kingdom (UK), the increased efficiencies of hybrid vehicles may be insufficient to satisfy new emissions standards.

One solution to reduce the toxic emissions of vehicles is the use of an exhaust after-treatment system. Exhaust after-treatment systems aim to reduce hydrocarbons, carbon monoxide, nitrous oxide, particulate matter, sulfur oxide, and volatile organic compounds such as chlorofluorocarbons. Examples of exhaust after-treatment systems include air injection (or secondary air injection), exhaust gas recirculation, and catalytic converters. An exemplary exhaust after-treatment system is described with reference to FIG. 6.

Electrically heated catalysts, or eCATs, are a type of catalytic converter, which have been in use for a number of years. An eCAT typically comprises a heating element disposed within, or near to, a catalyst. eCATs are required in various use cases and will demand a power supply between 0-4 kW (0 to 4000 Watts) for example, depending on the use case. For example, the heating elements within the eCATs will have a thermal output of 0-4 kW (0 to 4000 Watts). An eCAT typically has low inductance and therefore the power output (or thermal power output) can be changed rapidly. The eCAT produces thermal power to warm the catalyst but consumes an electrical current to produce the thermal power. The eCAT demand is supported by a hybrid powertrain electrical system in an HEV or PHEV platform. For example, in a cold start use case, the eCAT may demand its full rated power (e.g., ~4 kW) to maintain after-treatment temperature. In some examples, the power control module (PCM) demands the eCAT rated power from the HEV system for ~200 seconds. This load will be supported by the hybrid battery transiently until the e-machine can respond to support the load. However, in some use cases in which the e-machine can't support the total demand, the battery will need to support the eCAT power supply.

In other examples, the vehicle may be a full hybrid electric vehicle (FHEV) or a PHEV that can operate in electric only drive, without the engine running, using the high voltage system to propel the vehicle. However, in some use cases, the engine will need to start due to the limitations of the high voltage traction battery. For example, the engine may need to start during electric only driving to charge the battery or to support the torque demand by the driver. In transient manoeuvres, such as during an overtaking scenario, the engine may need to start so that the demanded torque can be satisfied.

During electric only driving, without thermal energy from the engine, the optimal aftertreatment temperature would not be maintained for all use cases. Therefore, if the engine is started, the emissions requirements may be exceeded. If the preheating strategy was to be adopted for the PHEV or FHEV applications, this could result in significant customer dissatisfaction, because there may be a delay before engine start to account for aftertreatment preheating even during a transient maneuver. Furthermore, if an engine torque de-rate is required after engine start due to particulate number (PN) requirements, similarly the PHEV customer may be dissatisfied if the demanded torque can't be satisfied.

Accordingly, in some examples, an after-treatment system comprising a battery, a heating module, electrically coupled to the battery, and a control module, communicatively coupled to the heating module and the battery, as is described in more detail below. In some examples, the heating module comprises a plurality of heating elements, wherein each element of the plurality of heating elements can be selectively operated. For example, each heating element may be activated and/or deactivated separately. In this way, each heating element could have a lower power consumption than the maximum power required to support the worst-case use case (e.g., a cold start use case at ~4 kW demand as mentioned previously). In some examples, in a total activation approach, wherein all of the plurality of the heating elements are selectively operated, the maximum power demand could still be satisfied to support the worst-case use case power demand.

The control module is configured to determine an operational parameter of the battery, such as the temperature of the battery and its components, a state of charge of the battery; a power demand from, for example, a hybrid power system and/or vehicle components; a current demand from, for example, the hybrid power unit and/or vehicle components; a voltage' contactor or relay state. The control module is further configured to determine a driving mode of the vehicle, such as electric driving mode, non-electric driving mode (e.g., a combustion engine is providing the driving force), or a hybrid driving mode (e.g., where an e-machine is supporting a combustion engine in providing the driving force of the vehicle).

The control module is further configured to receive an indication that a first operational parameter threshold has been surpassed. In some examples, the first threshold is a "soft threshold" that, once passed, may create an alert or generate an action to be carried out, such as: predict a torque demand of the vehicle; and provide heat, with the heating module, to the after-treatment system based on the predicted torque demand of the vehicle surpassing a second operational parameter threshold.

In particular, the systems and methods described herein may be used to deploy the eCAT to precondition the after-treatment and to maintain the aftertreatment temperature so that the emissions can be maintained, especially during electric only driving. If there is a transient torque demand from the driver, which forces the engine to start, the proposed solution will ensure the aftertreatment temperature remains optimal and therefore emissions are maintained upon engine start. This will prevent a delayed engine start (to allow preheating), mitigating customer dissatisfaction during a transient maneuver. Additionally, if the engine needs to start due to limitations of the high voltage system, with the aftertreatment preconditioned, the engine can start within the EU7 emissions legislation. For the avoidance of doubt, any of, or at least any part of, the system architectures described below may be implemented in any appropriate hybrid vehicle, and are not limited to implementation in any one type of hybrid vehicle.

FIG. 1 illustrates an example flow chart of a method of providing heat to a catalyst of an after-treatment system for a vehicle, in accordance with at least one of the examples described herein. Process 100 starts at step 102 where the system determines an operation parameter of a battery. In some examples, the operational parameter is an operational parameter of the battery of a vehicle, electrically coupled to the after-treatment system. In some examples, the operational parameter is at least one of a temperature; a state of charge; a power demand; or a power output.

In some examples, the one or more operational parameters comprise at least one of an engine temperature; an exhaust gas flow rate through the after-treatment system; a maximum thermal energy output from a heating module of the after-treatment system; and/or an amount of particulate matter in the after-treatment system. For example, if the ambient temperature of the environment of the after-treatment system is very low, more energy may be needed to be supplied to the eCAT to ensure that the after-treatment system is sufficiently preheated—which may have an influence on the demand on the battery at any given point.

At step 104, the system determines a driving mode of a vehicle. In some examples, the driving mode is one of electric only propulsion; combustion engine only propulsion; or a combination thereof (e.g., a combination of electric based propulsion and combustion based propulsion, i.e., hybrid propulsion). In some examples, the order of the steps in FIG. 1 is for illustrative purposes and, in some examples, step 104 may precede 102.

At step 106, the system receives an indication that a first operational parameter threshold has been surpassed. For example, if a predetermined 'safety threshold', which is intended to provide a "buffer" to the traditional predetermined hybrid vehicle battery limits, has been surpassed a signal or indication is sent to the system (e.g., the controller). In this way, for example, the controller has the information to determine that it is close to activating the internal combustion engine based on, but not limited to, any combination of the operational parameters. In some examples, implementing the 'soft thresholds', provide a buffer to the traditional 'hard limits' that hybrid vehicle battery at which the PCM would automatically activate the ICE to prevent damage to, for example; the vehicle, battery, after-treatment system, ICE, e-machine or hybrid power unit.

At step 108, the system predicts a torque demand of the vehicle. At step 110, the system provides heat to a catalyst of the after-treatment system based on the predicted torque demand of the vehicle surpassing a second operational parameter threshold.

In one exemplary implementation of the method, the torque demand of the vehicle is predicted, or determined, based on a navigation route. For example, the driver of the vehicle may have programmed a route into the car's satellite navigation system, which can be used to determine when more torque may be requested. In particular, the navigation system shows a route that presently shows a speed limit of 20 miles per hour (mph), then if the vehicle is in electric only driving mode, the torque demand is likely satisfied and an increase is not to be expected. However, if the navigation system indicates that a speed limit change from 20 mph to 50 mph is forthcoming, then it is highly likely a high torque demand on the vehicle is incoming. In such a situation, if the vehicle is in electric only driving mode, the ICE is likely to be required to meet the increase in torque demand. Thus, the eCAT can be activated to ensure that the after-treatment system is ready to activate the ICE without any negative impact on the driver's experience.

In some examples, GPS location data may be used in a similar way, for example, the vehicle GPS data may show that the vehicle is on a highway or motorway on-ramp, thus it can be predicted that the demanded torque will increase. Conversely, the vehicle may be at cruising speed on the motorway/highway, when the GPS data shows that the vehicle joins an off-ramp, thus it can be predicted that vehicle torque demand will decrease.

In some examples, peripheral vehicle systems, such as dashcams, auto-pilot systems, and/or advanced driver-assistance systems (ADAS) can be utilized to predict a change in driver torque demand. For example, ADAS systems may detect that a traffic light has changed from stop to go, and therefore this is an indication that the driver torque demand is going to increase. In other examples, the ADAS system can determine if overtaking is not permitted on the road ahead, if the vehicle is approaching a junction, or if a transition to a new speed limit is approaching—all of which can be used to predict a change in torque demand.

In some examples, historic driver data can be used to predict torque demand. For example, historic driver data may show that on a particular route, or road, or after a certain turn, or the like, the driver typically demands a high torque threshold that requires the ICE to be activated to assist with the demand.

In some examples, cruise control can be used to predict a torque demand. For example, if the cruise control is active, the torque demand is likely to remain constant. In some examples, the driver may make an input that indicates a change in torque demand, in particular an increase. For example, if the driver indicates onto a road with an incline, it is likely that the torque demand will increase dramatically. In the latter example, a combination of driver input (indicating) and GPS location and map data is used to make the prediction. Although some examples described above are made with reference to particular systems, it is intended that these systems may be combined in any way. In some examples, multiple systems are used to improve the accuracy of the prediction.

Therefore, the prediction of the torque demand may be based on at least one of GPS, ADAS, traffic sign recognition, cruise control, driver input, navigation route, ambient temperature, or historic route information.

These methods are more nuanced than simply checking if the after-treatment system is below temperature periodically, or activating the eCAT if the after-treatment system alone hits a low-temperature threshold. By taking into account a prediction of the driver torque demand, battery energy is saved, preventing depleting the battery to support eCAT unnecessarily, reducing overall battery energy throughput (i.e., by reducing the number of battery cycles), which would otherwise negatively impact hybrid vehicle range, battery durability, and aging. Put another way, the systems and methods enable making a more accurate decision on whether to activate the eCAT or not, to provide heat to the after-treatment system to pre-empting activation of the ICE. If it can be determined or predicted from said vehicle data sources that the torque will remain constant and that the ICE will not need to be activated to satisfy the driver torque demand, then the eCAT may not need to be activated.

Figure 2:
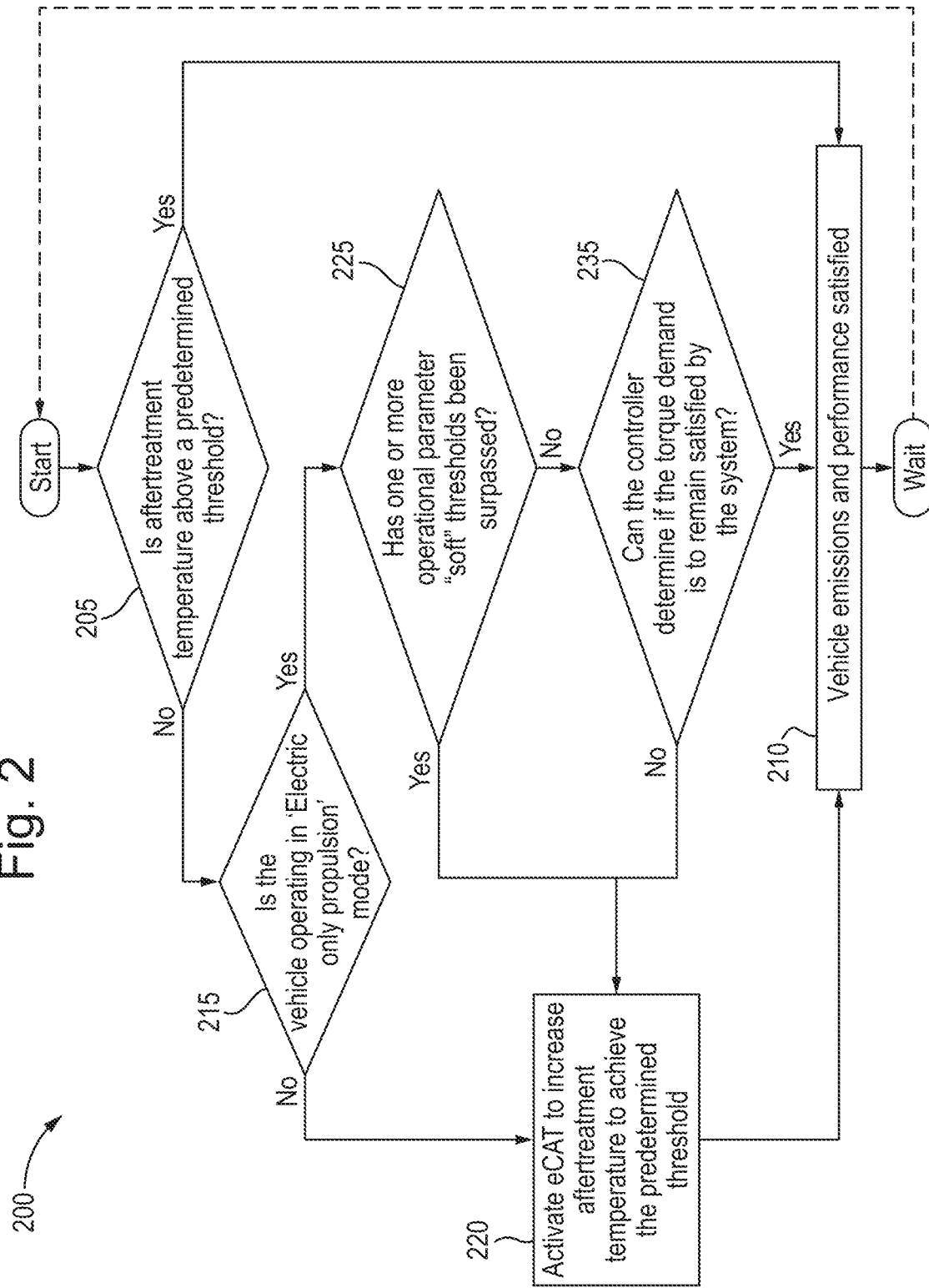
FIG. 2 illustrates an example flow chart of a method of providing heat to a catalyst of an after-treatment system, in accordance with at least one of the examples described herein.

FIG. 2 illustrates an example flow chart of a method of providing heat to a catalyst of an after-treatment system with an electronic catalyst, in accordance with at least one of the examples described herein. In some examples, the after-treatment system of a vehicle comprises a battery, a heating module, electrically coupled to the battery, comprising a plurality of heating elements, and a controller. The controller may be configured to carry out process 200, which starts at step 205. Process 200 is intended to show a series of decisions that may be made in relation to the methods discussed herein.

At step 205, it is determined if the aftertreatment temperature is above a predetermined threshold. In response to the answer to step 205 being yes, process 200 continues to step 210. At step 210, it is noted that the vehicle emissions and performance are presently satisfied. After step 210, process 200 may continue to step 230, wherein a waiting period is initiated before process 200 repeats. Moreover, in some examples, depending on the route to step 210 the process 200 has taken, an engine may be started during or before the waiting period. If the answer to step 205 is no, process 200 continues to step 215.

At step 215, it is determined if the vehicle operating in 'Electric only propulsion' mode. If the answer to step 215 is no, process 200 continues to step 220. At step 220 an eCAT is activated to increase aftertreatment temperature to achieve the predetermined threshold. In some examples, the eCAT is thermally coupled to the catalyst of the vehicle to enable the transfer of thermal energy to the catalyst after activation of the eCAT. After step 220, process 200 continues to step 210. If the answer to step 215 is yes, process 200 continues to step 225. At step 225, it is determined if one or more operational parameter thresholds have been surpassed—the so-called "soft" thresholds referred to previously.

If the answer to step 225 is yes, process 200 continues to step 220, as described above. If the answer to step 225 is no, then process 200 continues on to step 235. At step 235, it is determined if the controller can reliably determine and/or predict if the torque demand is to remain satisfied by the system. If the answer to step 235 is no, then process 200 continues on to step 220. If the answer to step 235 is yes, then process 200 continues on to step 210.

As has been briefly described previously, operational parameters are variables linked to the exhaust after-treatment system, the battery, the hybrid vehicle, or the ICE. For example, battery energy throughput, an engine temperature, and exhaust gas flow-rate through the after-treatment system, maximum thermal energy output from the plurality of heating elements, an amount of particulate matter in the after-treatment system, battery state of charge, battery temperature, battery power output, or the like. Lifetime energy throughput is the total amount of energy a battery can be expected to store and deliver over its lifetime.

In some examples, operating the heating module, or one or more heating elements of the heating module comprises operating a pulse-width modulation (PWM) switch electrically connected to the heating elements to modulate power from the vehicle battery.

In some examples, operating the heating module, or one or more heating elements of the heating module comprises operating DCDC controller electrically connected to the heating elements to modulate power from the vehicle battery.

Figure 3A:
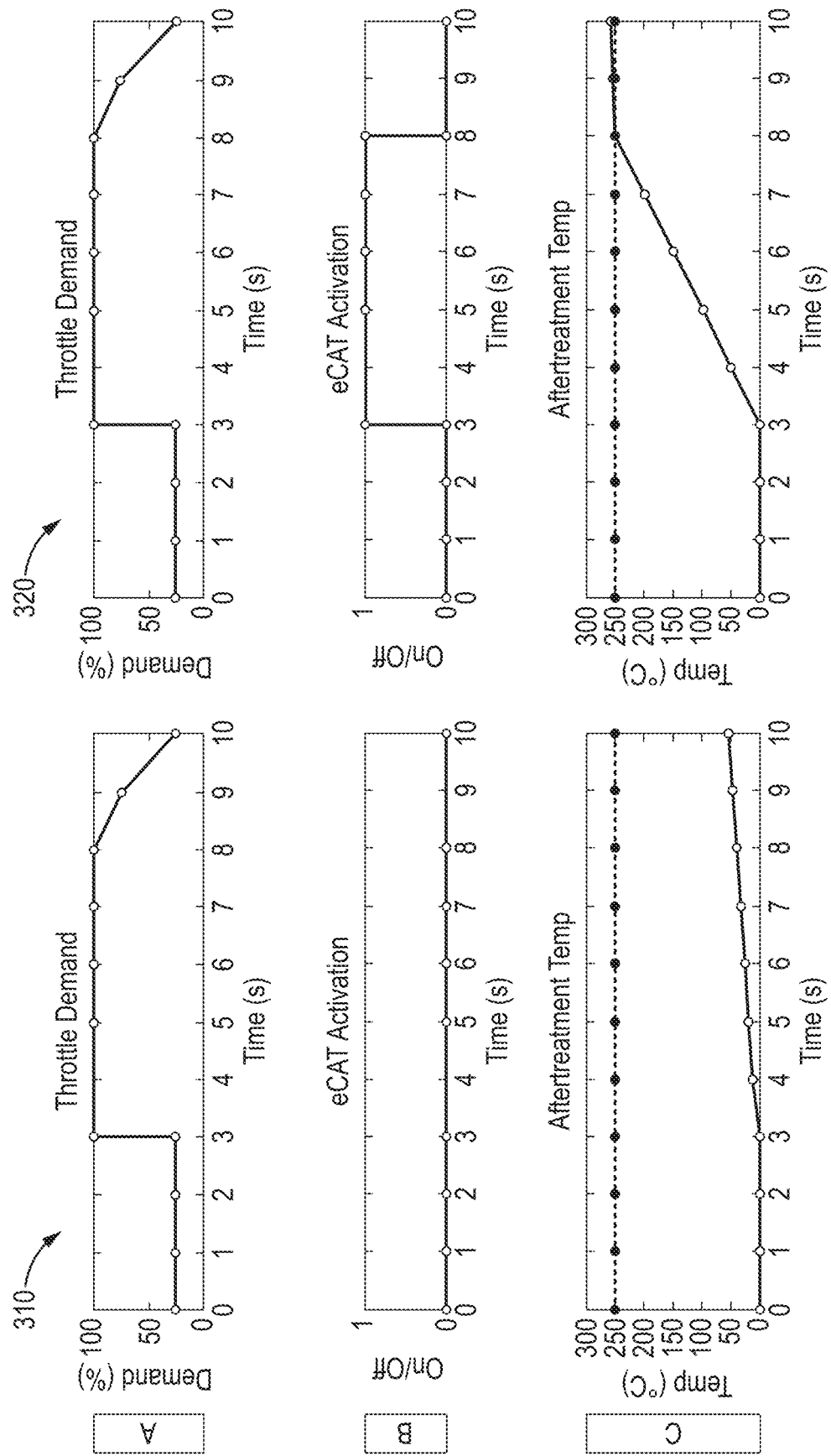
FIGS. 3A and 3B illustrate throttle demand, eCAT activation, after-treatment temperature, ICE state, and cumulative emissions, of a vehicle system with and without the teachings of the present disclosure, in accordance with at least one of the examples described herein.
Figure 3A:
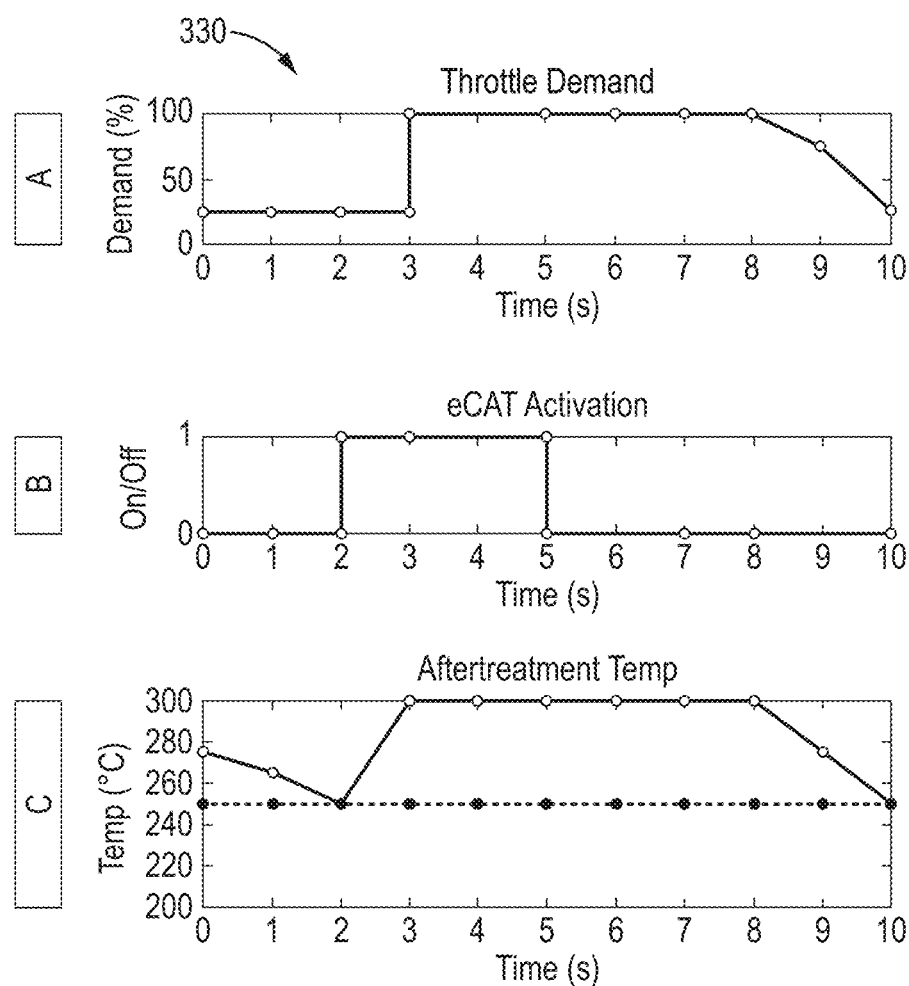
Figure 3B:
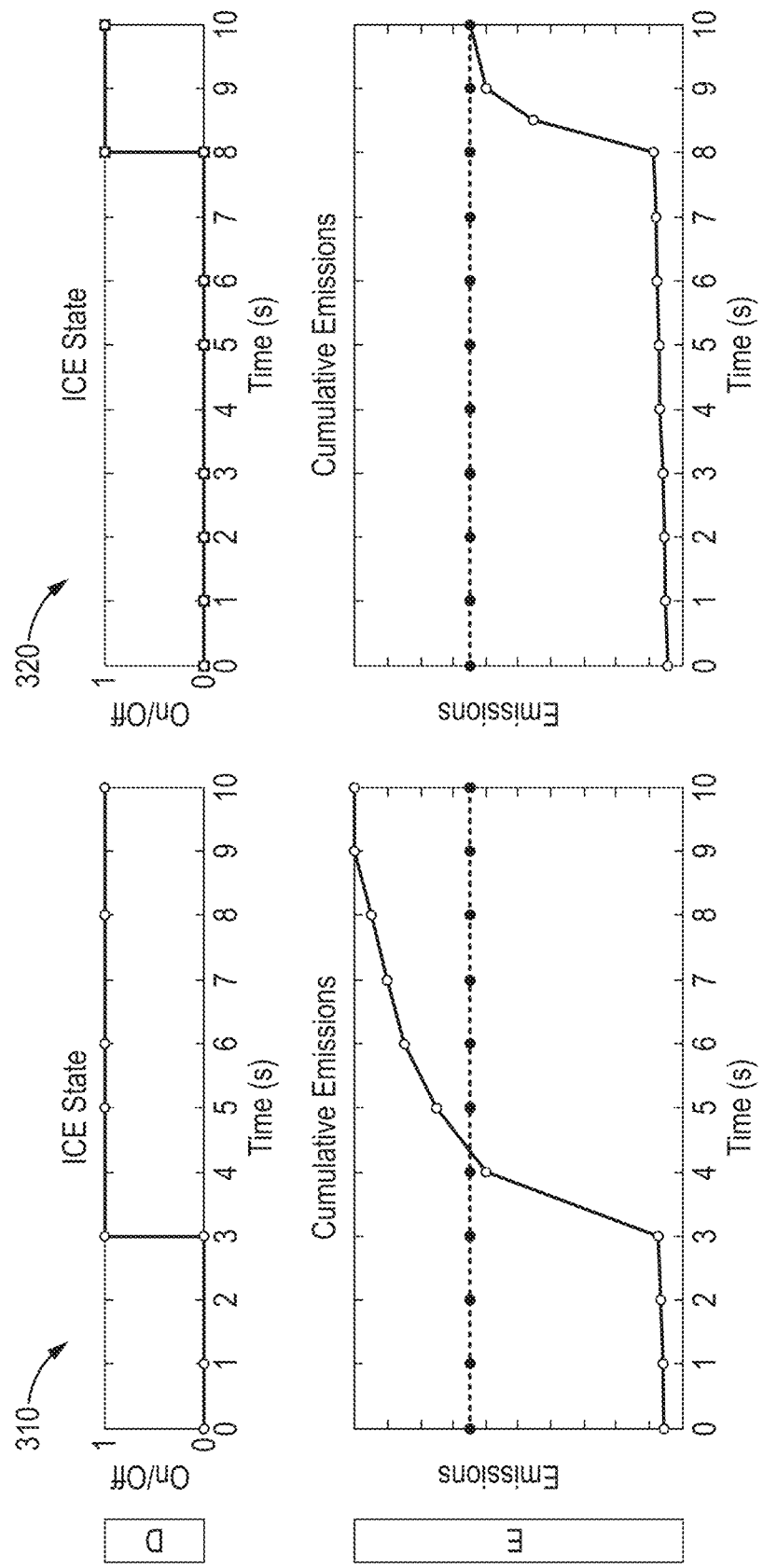
Figure 3B:
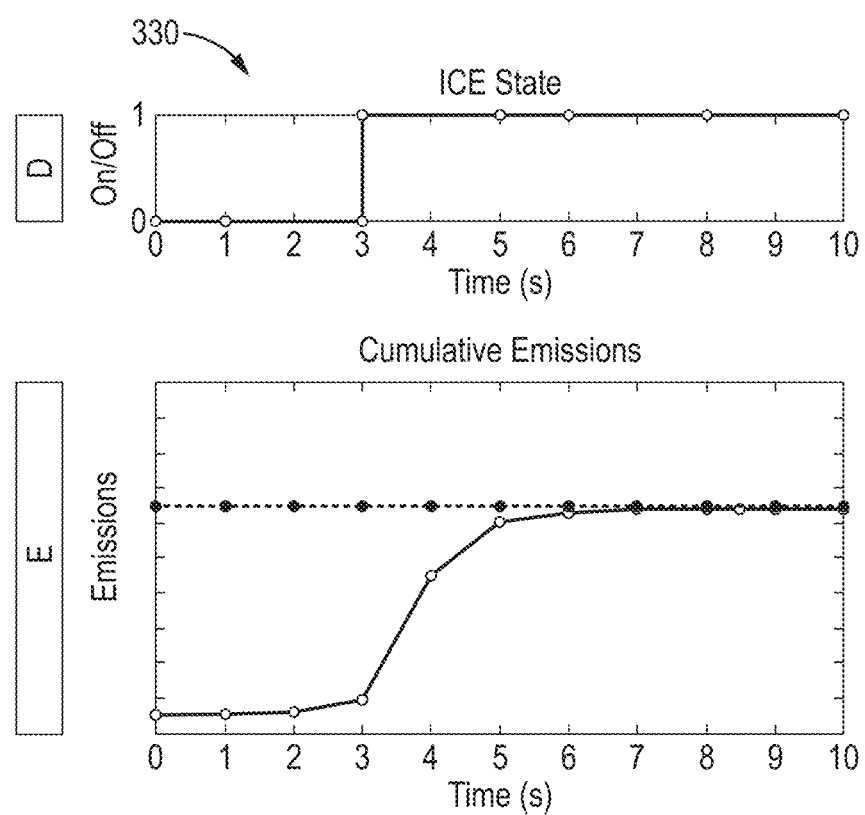

FIGS. 3A and 3B illustrate throttle demand, eCAT activation, after-treatment temperature, ICE state, and cumulative emissions, of a vehicle system with and without the teachings of the present disclosure, in accordance with at least one of the examples described herein. In particular, column 310 illustrates an example scenario without the present disclosures and without eCAT activation, column 320 illustrates a second example scenario without the present disclosures and with a "reactive" eCAT activation, and column 330 illustrates an example scenario case with examples of the present disclosure implemented and a predicted eCAT activation. FIGS. 3A and 3B illustrate the effect of the present disclosure on eCAT activation time and length for a driver torque demand use case and will be described with references to each column in turn.

Referring to column 310, which illustrates electric only driving. Column 310, row A, depicts the throttle demand issued by the user on the vehicle at time 3 s. As the vehicle is in electric only driving, no eCAT activation occurs in column 310, row B. As the torque demand is too high for the electric only driving, column 310, row D, shows that the ICE was started at 3 s also. As a consequence of the engine starting to satisfy the throttle demand from the driver, a high output of emissions occurs, as shown in column 310, row E. This is because the target aftertreatment temperature has not been achieved, shown by the black line at 250 degrees in column 310, row C. In FIGS. 3A and 3B, the black lines in the Aftertreatment temp (row C) and emissions graphs (row E) signify the target and limit values, respectively.

Referring to column 320, which illustrates preheating of the catalyst that starts at the point the driver demands the torque via the throttle, as shown in column 320, row A and B. Column 320, row C shows that during eCAT activation at time 3 s, the after-treatment temperature steadily increases. However, the ICE does not start until the target aftertreatment temperature is met at 8 s, shown in column 320, row D. While the cumulative emissions, shown in column 320, row E are maintained, there is a severe delay between throttle demand at time 3 s and ICE activation at 8 s, resulting in customer dissatisfaction due to the delayed torque response.

Referring to column 330, which illustrates that aftertreatment is maintained at or above the target temperature (row c). Prior to throttle demand at column 330, row A, the eCAT is activated, as shown in row B. This is due to the throttle demand being reliably predicted as described above, in particular with reference to FIGS. 1 and 2. In this way, not only is the after-treatment temperature brought to an optimum level prior to ICE start (row B), the ICE is able to start as soon as a significant torque is demanded by the driver, which cannot be satisfied in electric propulsion mode is made (row D), and the cumulative emissions are maintained at all times, as shown in row E. Shown in column 330 is that the after-treatment temperature is already above the threshold temperature, however, due to the prediction of the increase in throttle demand, even if the after-treatment temperature was below the threshold, the eCAT would have been activated and the after-treatment brought to optimum temperature so that the ICE could start at throttle demand, or significantly reducing the lag with respect to column 310.

FIGS. 4A and 4B illustrate battery State of Charge (SOC), eCAT activation, Aftertreatment temperature, ICE state, cumulative emissions, in accordance with at least one of the examples described herein. In particular, column 410 illustrates an example scenario without the present disclosures and without eCAT activation, and column 420 illustrates an example scenario case with examples of the present disclosure implemented and a predicted eCAT activation. FIGS. 4A and 4B illustrate the effect of the present disclosure on eCAT activation time and length for a battery state of charge use case and will be described with references to each column in turn. In FIGS. 4A and 4B, the black line in the aftertreatment temp and emissions graphs signifies the target or limit values, the blue dotted line signifies the threshold in which the preconditioning methods would initiate based on the SOC, in preparation for engine start.

Referring to column 410, which depicts the example scenario that an engine is started to charge the battery when the battery State of Charge (SOC) reaches a predetermined 'low' threshold value. As shown in column 410, row A, the battery SOC reaches a threshold value (black line) when initiates the ICE to be activated (row D). However, the eCAT has not been activated (row B) and thus the after-treatment temperature is not at the threshold temperature (row C). When the engine is started, a large quantity of emissions is generated, as shown in row E, which does not satisfy the legislative requirement.

Referring to column 420, which depicts an exemplary intended solution. As shown in column 420, row A, the eCAT is activated once the battery SOC surpasses a first "soft" threshold (shown by the blue line), which is greater (with regard to SOC) than the second threshold that would trigger the engine start (shown by the black line). In some examples, the first threshold is configurable and is determined based on the amount of energy required to increase the aftertreatment temperature above the target temperature threshold, as shown in row C. In row B, the eCAT is activated in response to the first threshold being surpassed and determining that the ICE will need to be started to prevent the battery SOC from passing the second threshold. Accordingly, the after-treatment temperature is reaches (row C) and the ICE is started (row D), to begin charging the battery. As shown in row E, due to the aftertreatment preconditioning the emissions generated when the engine is started are maintained within the legislation/regulation limits.

The values shown in FIGS. 3A-4B are for illustrative purposes. It should be understood that many other variables affect how the battery state of charge and after-treatment temperature, eCAT activation time, and the like increase and decrease. However, these values have been generated to further illustrate the advantages and benefits of the present disclosure. In some examples, combinations of one or more of the examples disclosed herein may further improve the benefit gained.

FIG. 5 illustrates an example flow chart of a method of providing heat to a catalyst of an after-treatment system and starting an engine of the vehicle, in accordance with at least one of the examples described herein. Process 500 starts at step 502, wherein heat is provided to the catalyst until the catalyst reaches a threshold temperature. In some examples, the after-treatment threshold temperature may be the same as the most efficient temperature of the catalyst, e.g., for a given operating condition. In some examples, the threshold temperature may be above the most efficient temperature of the catalyst, to allow for some cooling effects between ending the heating of the after-treatment system and later starting an engine, such as an ICE. In some examples, the threshold temperature may be below the most efficient temperature of the catalyst, to allow for heating from the engine exhaust to bring the catalyst up to its most efficient temperature—providing that the emissions regulations are adhered to. In some examples, in response to determining that the threshold temperature has been achieved, the method further comprises deactivating the heating module of the after-treatment system, further reducing the impact on HEV battery throughput. In some examples, process 200 further comprises selectively operating one or more of a plurality of heating elements of the heating module to provide heat to the catalyst based on an operational parameter of the after-treatment system.

At step 504, an engine of the vehicle is started after the after-treatment system reaches the threshold temperature. In some examples, providing heat to the catalyst of the after-treatment system may be reliant, at least in part, upon airflow passing over the heating element to transfer the thermal energy to the catalyst and to protect the element from overheating. Therefore, before engine start and thus without the exhaust gas flow of a running engine, a pump may be added to the system to enable the transfer of thermal energy from the eCAT to the catalyst by generating airflow in the exhaust to transfer the thermal energy from the heating element to the catalyst. In some examples, this may include adding a pump to the exhaust gas recovery (EGR) circuit or utilizing (or repurposing) an e-compressor of the vehicle.

Figure 6:
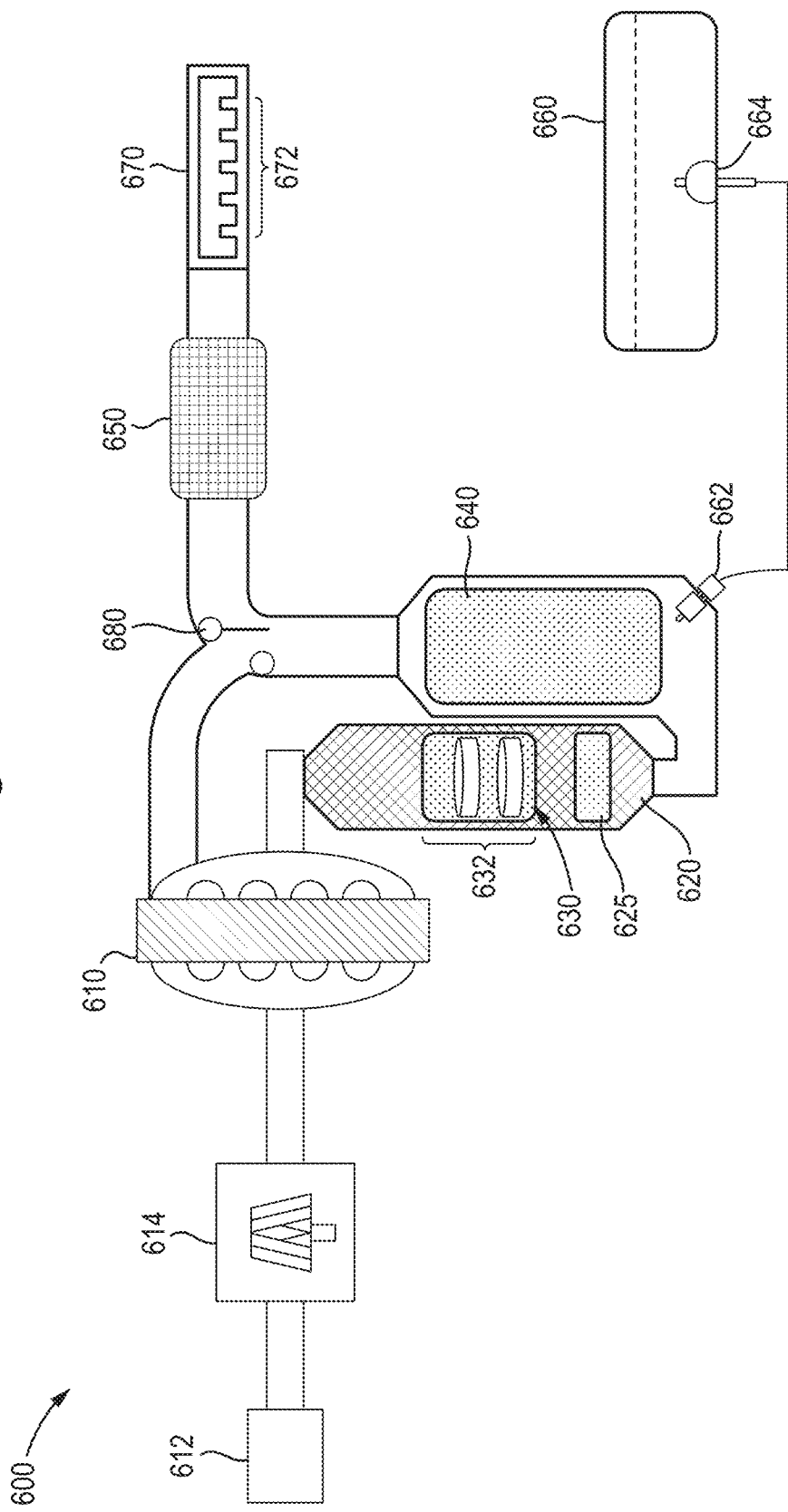
FIG. 6 illustrates an exemplary exhaust system comprising an after-treatment system, in accordance with at least one of the examples described herein.

FIG. 6 illustrates an exemplary exhaust system 600 comprising an engine 610 and an after-treatment system, comprising an eCAT 620. In some examples, the eCAT 620 comprises a catalyst 625 that is provided heat by the methods as described herein. In some examples, and as shown in FIG. 6, there is provided with an air-box 612 connected to a compressor 614 to draw air from the atmosphere. The airbox 612 and compressor 614 are fluidly connected to engine 610 and the after-treatment system to transfer thermal energy from a plurality of heating elements 632 disposed within the heating module 630 within the after-treatment system to the rest of the after-treatment system (e.g., to the catalyst 625). In some examples, to support local emissions regulations, additional systems such as an e-compressor 614 may be required. One advantage of the present system, in saving battery life by reducing throughput over time, the existing battery can support potential additional throughput demands from additional devices added retroactively or at the time of manufacture, without the need to increase the capacity of the battery or reduce the vehicle's expected lifetime.

In some examples, there is a diesel particulate filter 640 downstream of engine 610. A diesel particulate filter (DPF) is a filter that captures and stores exhaust soot, coke, and/or char, collectively referred to as particulate matter. The DPF is another form of after-treatment utilized to reduce emissions from diesel cars. DPFs have a finite capacity, the trapped particulate matter periodically has to be emptied or 'burned off' to regenerate the DPF, which an eCAT may also be used to assist with. This regeneration process cleanly burns off the excess particular matter deposited in the filter, reducing the harmful exhaust emission. In some examples, the regeneration process may be initiated in response to predicting that there will be no increase in torque demand. For example, if the amount of particular matter within the after-treatment system is determined to be above a threshold and a regeneration process is required, the after-treatment system can wait until a prediction that no increase in torque demand will be made by the driver to regenerate the after-treatment system (e.g., the DPF).

In some examples, wherein the vehicle's internal combustion engine is fuelled by gasoline, there is a gasoline particulate filter (GPF), which would replace the DPF as described above, downstream of engine 610. Similar to a DPF, a GPF is a filter that captures and stores exhaust soot, coke, and/or char, collectively referred to as particulate matter. The GPF is another form of after-treatment utilized to reduce emissions from gasoline vehicles. GPFs have a finite capacity, the trapped particulate matter periodically has to be emptied or 'burned off' to regenerate the GPF, which an eCAT may also be used to assist with. This regeneration process cleanly burns off the excess particular matter deposited in the filter, reducing the harmful exhaust emission. In some examples, the regeneration process may be initiated in response to predicting that there will be no increase in torque demand. For example, if the amount of particular matter within the after-treatment system is determined to be above a threshold and a regeneration process is required, the after-treatment system can wait until a prediction that no increase in torque demand will be made by the driver to regenerate the after-treatment system (e.g., the GPF).

In some examples, there is also provided with a selective catalytic reduction (SCR) 650 system. An SCR is another emissions control technology system that injects a liquid-reductant agent through a special catalyst into the exhaust stream of engines, in particular diesel engines. The reductant source is usually automotive-grade urea, otherwise known as diesel exhaust fluid (DEF). The DEF sets off a chemical reaction that converts nitrogen oxides into nitrogen, water, and low amounts of carbon dioxide ($CO_2$), which is then expelled through the vehicle tailpipe 670. The DEF may be stored in a DEF tank 660. The DEF may be distributed through several pumps and valves 662 and 664, as shown in FIG. 6. The number of pumps and valves 662 and 664 are for illustration purposes and additional pumps and valves 662 and 664 may be located throughout the exhaust and/or after-treatment system. The location of the pumps and valves 662 and 664 are similarly for illustration purposes and the location of the pumps and valves 662 and 664 can be different from that shown in FIG. 6.

In some examples, the exhaust system comprises several sensors 672 to detect the flue gas containing oxides of nitrogen (NOx) and oxides of sulfur (SOx), to ensure the final emissions are within a regulation amount. Euro 5 exhaust emission legislation and Euro 6 exhaust emission legislation, have effectively made it mandatory for DPFs, DEF, and SCRs to meet the emissions standards. However, future emission legislation, such as Euro 7, such technology alone may not be sufficient. The systems and embodiments described herein may replace, or work in conjunction with DPFs, DEF, and SCRs and meet the future standards.

In some examples, the exhaust system comprises an exhaust gas recovery system, which is enabled by an EGR switch 680. The EGR switch 680 enables some or all exhaust gas, or the thermal energy of the exhaust gas, to be recirculated through the exhaust system to further compound the heating effect of the heating elements 632 within the heating module 630.

Figure 7:
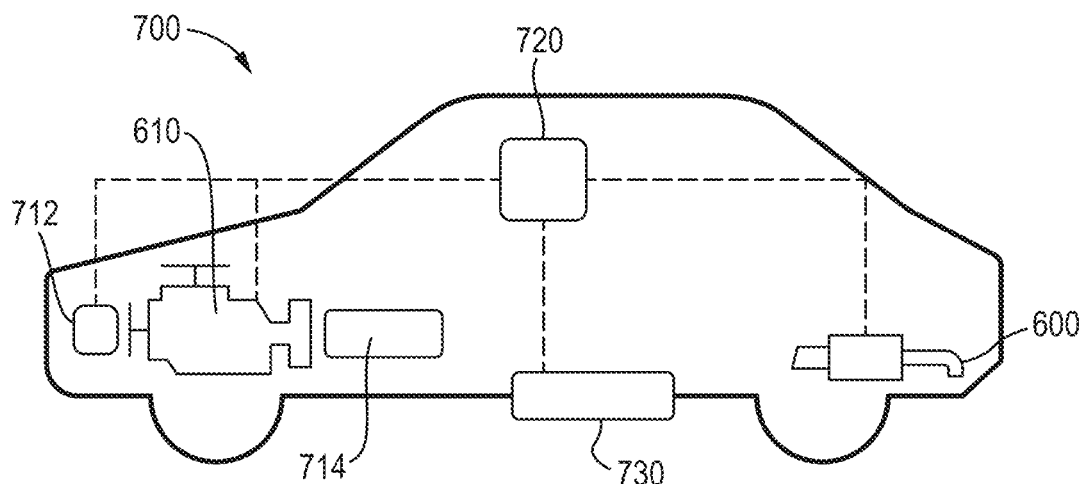
FIG. 7 illustrates a vehicle comprising an engine and an exemplary exhaust system, in accordance with at least one of the examples described herein.

FIG. 7 illustrates a vehicle 700 comprising an engine 610, an exemplary exhaust system 600, a control module 720, and a battery 730, in accordance with at least one of the examples described herein. According to some examples, there is provided with a vehicle 700 comprising an exhaust system 600 as described with reference to FIG. 6. In some examples, the vehicle further comprises a drive train comprising an e-machine 712, an engine 610, clutch and transmission 714. The exhaust system 600 may comprise an eCAT as described in any of the examples above.

The methods described above may be implemented on vehicle 700. In some examples, the preconditioning of the exhaust system 600 comprising the after-treatment system is based on the aftertreatment temperature and the battery state of charge (SOC). If the aftertreatment temperature decreases below the optimal temperature for conversion, the eCAT will be activated and supported by the HV system to ensure the aftertreatment temperature is maintained, only when an increase in torque demand is expected and the vehicle is in electric only drive mode. In some examples, the Powertrain Control Module (PCM) 720 commands that the system supplies the minimal power required to the eCAT to achieve and maintain the optimal temperature because this consumption of power will negatively impact the electric only driving range due to depletion of the battery in supplying the eCAT with energy.

Each of the systems in the vehicle are communicatively coupled via controller 720 (illustrated by the dashed line connectors) However, the present disclosure is not limited to the set-up shown in FIG. 7. For example, the controller 720 may be any appropriate type of controller, such as a stand-alone controller, or any other appropriate controller of the hybrid vehicle. For example, the controller 720 may, at least in part, be integrated with another controller of the vehicle. Furthermore, the controller 720 may be configured to operationally communicate with any one or more of the vehicle components shown in FIGS. 6-8, and/or any other appropriate components of the vehicle. For example, controller 720 may be a stand-alone controller at least partially configured to operationally communicate with at least one low voltage accessory, an electric generator, and an eCAT, to control torque demand on the engine 610. Furthermore, it is understood that controller 720 may be configured to carry out one or more of the above-disclosed electrical power control methods for a hybrid vehicle, as described above.

As shown and described in FIGS. 3A-4B, the proposed solution or preconditioning strategy will mitigate customer dissatisfaction that would arise if a delay to starting the engine would be required to allow preheating. Furthermore, the graphs demonstrate how the preconditioning would be demanded based on the aftertreatment temperature. In addition, the present disclosure can be used to mitigate the use case in which the engine needs to start to charge the battery, irrespective of the torque demand from the driver. In this case, the preconditioning could be initiated based on one or more operational parameters, such as the battery SOC, battery power limits, battery temperature, or the like. Without preconditioning the aftertreatment, emissions legislation may not be maintained as the engine starts.

Furthermore, in some examples, an additional energy reserve is required within the battery useable energy content to guarantee energy is available to support preconditioning the after-treatment system, which may be achieved by configuring the operational parameter "soft" threshold. Configuring the "soft" threshold may be particularly useful at or near the end of the expected battery life, or simply as the battery ages. In addition, this can also be considered when sizing the battery at manufacture.

In some examples, once the energy reserve (i.e., the energy between the "soft" and "hard" thresholds) has been depleted to support after-treatment heating (e.g., preconditioning), the methods further comprise a period of charging the battery from the ICE, or after a driving period, to replenish the energy reserve as a priority to ensure energy is available to support preconditioning when next required.

Accordingly, with less energy throughput over the expected lifetime of the vehicle, the proposed solutions enable a reduction in the degradation or aging in battery life, without the need to increase the battery capacity and therefore cost. Advantages of the present disclosure are clear, however, it is emphasized that the present teachings reduce the degradation of discharge/charge performance (e.g., through reducing the increase in internal resistance) and battery aging (i.e., helping to maintain durability) over the life of the battery of, for example, an HEV system. The present teachings will also apply, however, to any system wherein a battery has significant energy throughput and suffers from an increase in internal resistance and battery aging as a result.

Figure 8:
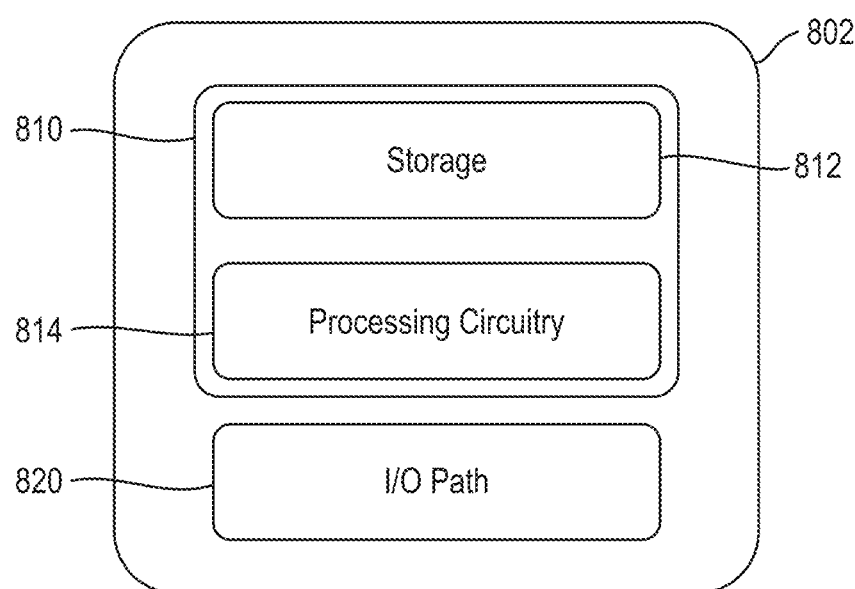
FIG. 8 illustrates a block diagram of a computing module, in accordance with some embodiments of the disclosure.

FIG. 8 illustrates a block diagram 800 of computing module 802, in accordance with some embodiments of the disclosure. In some examples, computing module 802 may be communicatively connected to a user interface. In some examples, computing module 802, may be the controller 720 of the vehicle 700 as described with FIG. 7. In some examples, computing module 802 may include processing circuitry, control circuitry, and storage (e.g., RAM, ROM, hard disk, a removable disk, etc.). Computing module 802 may include an input/output path 1206. I/O path 820 may provide device information, or other data, over a local area network (LAN) or wide area network (WAN), and/or other content and data to control circuitry 810, which includes processing circuitry 814 and storage 812. Control circuitry 810 may be used to send and receive commands, requests, signals (digital and analog), and other suitable data using I/O path 820. I/O path 820 may connect control circuitry 810 (and specifically processing circuitry 814) to one or more communications paths. In some examples, computing module 802 may be an on-board computer of a vehicle, such as vehicle 700.

Control circuitry 810 may be based on any suitable processing circuitry such as processing circuitry 814. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some examples, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some examples, control circuitry 814 executes instructions for computing module 802 stored in memory (e.g., storage 812).

The memory may be an electronic storage device provided as storage 812, which is part of control circuitry 810. As referred to herein, the phrase "electronic storage device" or "storage device" should be understood to mean any device for storing electronic data, computer software, or firmware, such as random-access memory, read-only memory, hard drives, solid-state devices, quantum storage devices, or any other suitable fixed or removable storage devices, and/or any combination of the same. The non-volatile memory may also be used (e.g., to launch a boot-up routine and other instructions). Storage 812 may be subdivided into different spaces such as kernel space and user space. Kernel space is a portion of memory or storage that is, e.g., reserved for running a privileged operating system kernel, kernel extensions, and most device drivers. User space may be considered an area of memory or storage where application software generally executes and is kept separate from kernel space so as to not interfere with system-vital processes. Kernel mode may be considered as a mode when control circuitry 810 has permission to operate on data in kernel space, while applications running in user mode must request control circuitry 810 to perform tasks in kernel mode on its behalf.

Computing module 802 may be coupled to a communications network. The communication network may be one or more networks including the Internet, a mobile phone network, mobile voice or data network (e.g., a 3G, 4G, 5G or LTE network), mesh network, peer-to-peer network, cable network, cable reception (e.g., coaxial), microwave link, DSL reception, cable internet reception, fiber reception, over-the-air infrastructure or other types of communications network or combinations of communications networks. Computing module 802 may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

In some examples, the control circuitry 810 is configured to carry out any of the methods as described herein. For example, storage 812 may be a non-transitory computer-readable medium having instructions encoded thereon, to be carried out by processing circuitry 814, which cause control circuitry 810 to carry out a method to provide heat to a catalyst of an after-treatment system for a vehicle, the after-treatment system comprising a heating module having a plurality of heating elements, wherein each of the plurality of heating elements is independently operable to provide thermal energy to the catalyst of the after-treatment system, the method comprising: selectively operating one or more of the heating elements of the heating module to provide heat to the catalyst based on an operational parameter of the after-treatment system.

It should be understood that the examples described above are not mutually exclusive with any of the other examples described with reference to FIGS. 1-8. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed embodiments can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

This disclosure is made to illustrate the general principles of the systems and processes discussed above and is intended to be illustrative rather than limiting. More generally, the above disclosure is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it shall be appreciated that the disclosure is not limited thereto. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some, and/or all features in one aspect can be applied to any, some, and/or all features in any other aspect, in any appropriate combination. It should also be appreciated that particular combinations of the various features described and defined in any aspect can be implemented and/or supplied and/or used independently.

The invention claimed is:

1. A method of providing heat to a catalyst of an after-treatment system for a vehicle comprising an engine, the after-treatment system being powered by a battery, the method comprising:
   determining an operational parameter of the battery;
   predicting an activation of the engine based on determining that the operational parameter is approaching a first threshold and a torque demand, wherein the first threshold indicates a level at which the engine will be activated to charge the battery; and
   providing heat to the catalyst of the after-treatment system in response to the battery operational parameter reaching a second threshold, wherein the second threshold is set at a level higher than the first threshold, and wherein the catalyst is activated before the operational parameter reaches the first threshold.

2. The method of claim 1, further comprising:
   configuring the second threshold based on an amount of energy required to increase a temperature of the catalyst above a target temperature.

3. The method of claim 1, wherein the providing heat to the catalyst further comprises:
   passing airflow over a heating element, wherein the airflow transfers thermal energy to the catalyst.

4. The method of claim 3, wherein the providing heat to the catalyst further comprises: using a pump to generate the airflow over the heating element prior to engine activation.

5. The method of claim 1, further comprising,
   monitoring the temperature of the after-treatment system; and
   adjusting the heat provided to the catalyst of the after-treatment system based on the monitored temperature.

6. The method of claim 1, further comprising:
   providing heat to the catalyst until the catalyst reaches a target temperature; and
   activating the engine of the vehicle after the after-treatment system reaches the target temperature.

7. The method of claim 1, the method further comprising:
   determining a minimum amount of energy required to meet an optimal temperature for catalyst light off.

8. The method of claim 1, wherein the battery operational parameter is at least one of:
   a temperature;
   a state of charge;
   a power demand;
   a current demand;
   a voltage; or
   a contactor or relay state.

9. The method of claim 1, wherein predicting an activation of the engine based on determining that the operational parameter is approaching a first threshold, and a torque demand further comprises:
   predicting the torque demand based on at least one of GPS, ADAS, traffic sign recognition, cruise control, driver input, navigation route, ambient temperature, or historic route information.

10. A system for providing heat to a catalyst of an after-treatment system for a vehicle comprising an engine, the after-treatment system being powered by a battery, the system comprising control circuitry configured to:
    determine an operational parameter of the battery;
    predict an activation of the engine based on determining that the operational parameter is approaching a first threshold and a torque demand, wherein the first threshold indicates a level at which the engine will be activated to charge the battery; and
    provide heat to the catalyst of the after-treatment system in response to the battery operational parameter reaching a second threshold, wherein the second threshold is set at a level higher than the first threshold, and wherein the catalyst is activated before the operational parameter reaches the first threshold.

11. The system of claim 10, wherein the control circuitry is further configured to:
    configure the second threshold based on an amount of energy required to increase a temperature of the catalyst above a target temperature.

12. The system of claim 10, wherein the control circuitry is configured to provide heat to the catalyst by:
    passing airflow over a heating element, wherein the airflow transfers thermal energy to the catalyst.

13. The system of claim 12, wherein the control circuitry is configured to provide heat to the catalyst by:
    using a pump to generate the airflow over the heating element prior to engine activation.

14. The system of claim 10, wherein the control circuitry is further configured to:
    monitor the temperature of the after-treatment system; and
    adjust the heat provided to the catalyst of the after-treatment system based on the monitored temperature.

15. The system of claim 10, wherein the control circuitry is further configured to:
    provide heat to the catalyst until the catalyst reaches a target temperature; and
    activate the engine of the vehicle after the after-treatment system reaches the target temperature.

16. The system of claim 10, wherein the control circuitry is further configured to:
    determine a minimum amount of energy required to meet an optimal temperature for catalyst light off.

17. The system of claim 10, wherein the battery operational parameter is at least one of:
    a temperature;
    a state of charge;
    a power demand;
    a current demand;
    a voltage; or
    a contactor or relay state.

18. The system of claim 10, wherein the torque demand is predicted based on at least one of GPS, ADAS, traffic sign recognition, cruise control, driver input, navigation route, ambient temperature, or historic route information.

* * * * *